United States Patent [19]

Lindenthal

[11] Patent Number: 4,822,204
[45] Date of Patent: Apr. 18, 1989

[54] FLANGE COUPLING

[75] Inventor: Hans Lindenthal, Heidenheim, Fed. Rep. of Germany

[73] Assignee: J. M. Voith GmbH, Heidenheim, Fed. Rep. of Germany

[21] Appl. No.: 100,992

[22] Filed: Sep. 25, 1987

[30] Foreign Application Priority Data

Sep. 25, 1986 [DE] Fed. Rep. of Germany ... 8625580[U]

[51] Int. Cl.[4] .............................................. F16D 1/00
[52] U.S. Cl. ..................................... 403/337; 403/183
[58] Field of Search ................................. 403/337, 183

[56] References Cited

U.S. PATENT DOCUMENTS 2,617,672 11/1952 Nichols ............................... 403/183
2,879,092 3/1959 Hargrove et al. .................. 403/337

Primary Examiner—Andrew V. Kundrat
Attorney, Agent, or Firm—Grimes & Battersby

[57] ABSTRACT

A pair of coupling sections, preferably tubular halves, having radially extending flanges are provided with front faces adapted to abut each other. The coupling sections are joined by screw or other axially tensioned connecting elements passing through the abutting flanges, and at least the area of the contacting faces about the axially tensioned connection elements are provided with a layer of granular material.

7 Claims, 1 Drawing Sheet

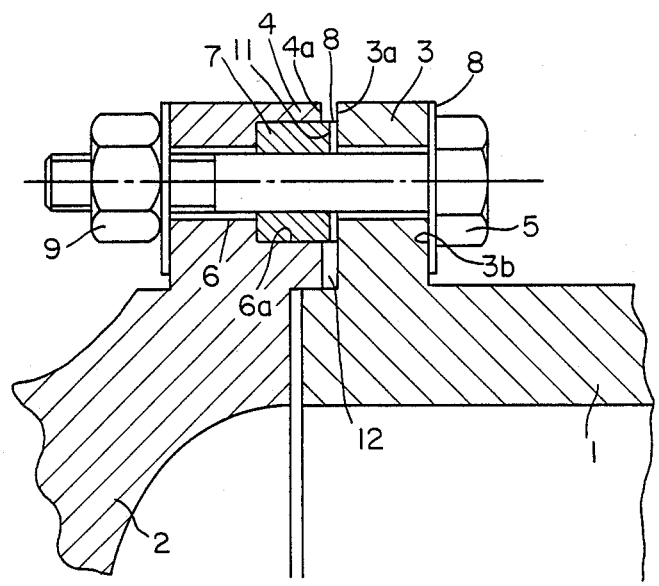

FLANGE COUPLING

BACKGROUND OF THE INVENTION

The present invention relates to a coupling for rigidly connecting two coaxial rotatable machine parts, suitable for the transmission of torque from one to the other and, more particularly, to such a coupling which includes a layer of granular material between the contact surfaces of two halves of the coupling.

The known couplings for rotary machine parts generally comprise two flanges having planar faces which flanges abut one another and which planar faces are arranged vertically with respect to the axis of rotation. The flanges and planar faces are fastened to each other by screws or other connecting elements and the torque is transferred thereby exclusively by frictional resistance and the tensile stress of the connecting elements.

The transference of the torque is limited by the space requirement for the flanges and the axial tension force of the abutting connecting elements. In the specific coupling shown in U.S. Pat. No. 4,242,889 which issued to Mueller, et al on Jan. 6, 1981, the front faces of the flanges are provided with conical grooves or ribs, respectively. As a result, an increased frictional resistance is generated under the tension force of the connecting screws which permits the transfer of the major circumferential forces and torque. However, in such structures, the flanges must be formed and made by a precise and therefore expensive process. Soiling of or damage to the ribs or grooves creates the danger of error in the assembly or an inexact centering of the two flanges.

It is also known to design friction surfaces of various materials which contact each other. For instance, coatings of sintered metal, plastic material, or other composite materials have been used for multiple disk clutches, or brake linings. The object is always to increase the friction between the contact surfaces, especially when the latter would tend to slide against each other during operation.

In couplings having frontal faces, which are in a relatively rest position with respect to each other, substantially higher surface loads tend to be exerted. Known friction linings cannot last long when used in such couplings. Frequently, flange connections, such as flange connections for shafts carrying pressurized fluid mediums, must in addition, be leakproof. The ability of the flange connection to be leak proof creates a greater difficulty, such as when manufacturing, particularly with composite and separately fastened friction linings.

The invention is predicated on the task of creating a flange connection between two machine parts for the effective transfer of torque.

It is a particular object to provide a coupling connection which is simple in structure and has a smaller flange diameter.

These objects together with other objects and advantages, are set forth and will be apparent from the following disclosure of the present invention.

SUMMARY OF THE INVENTION

A coupling is provided for rigidly connecting a pair of coaxial rotary machine parts, such as abutting shafts comprising a pair of coupling sections, preferably tubular halves, having radially extending flanges provided with front or frontal faces adapted to abut each other. The coupling sections are joined by screw bolts or other axially tensioned connecting elements passing through the abutting flanges. In accordance with the present invention, at least the area of the contacting faces about the axially tensioned connecting elements are provided with a layer of granular material.

Preferably, the layer of granular material about the connecting elements is applied to extend between the frontal surfaces. When the two coupling sections are clamped together by the connecting elements, the granular material is pressed into both front surfaces. In this way, a mixed form-fitting and friction-tight closure is created between the two sections of the coupling. This makes possible the use of smaller screws, as well as the reduction of the outside diameter of the flange.

The present invention also provides for the formation of a layer of granular material o the front surfaces of the coupling sections and on the surfaces under the head of the connecting elements. Further, it is sufficient in many cases if only one of the contact surfaces is provided with a coating of the granular material.

An important aspect of the present invention lies in the fact that the layer is, preferably, not applied directly to the front surfaces of the coupling sections, but that an annular disk is provided over several or all of the connecting screws. The disk may be in the form of a plug or washer or the like, and is inserted or preferably pressed so as to be captive in form-fitting the shape into a recess in the front face of one of the two opposed flanges. These disks are therefore coated only on one side and may be held in reserve as a spare part, so that they may easily be exchanged.

Another feature of the present invention may be obtained in combination with a coupling having the front surfaces of the two coupling sections formed flange-like according to, U.S. Pat. No. 4,543,011, which issued to Lindenthal, the patentee of the present application on Sep. 24, 1985 and is incorporated herein by reference, and which are connected by axially and radially overlapping clamping dishes. The radial surfaces under axial tension load may be coated according to the present invention, so that also a flange connection can be designed with smaller outer dimensions.

Especially suited a the coating material for the present invention, is a granulate of tungsten carbide which may be sprayed, e.g., by a detonation process on the surface in question.

Greater details of the present invention are set forth in the following description and illustrated in the accompanying drawing.

BRIEF DESCRIPTION OF THE DRAWING

The drawing is a sectional view, partially broken away, of a coupling embodying the present invention.

DESCRIPTION OF THE INVENTION

The coupling is illustrated (not in scale) in cross-section in FIG. 1. The coupling includes two tubular coupling sections or halves, 1 and 2, which are bodies of rotation about a central longitudinal axis (not shown). Extending radially from each section 1 and 2, are radial flanges 3 and 4, respectively, having front planar faces 3a and 4a, respectively, adapted to contact each other. Both coupling sections 1 and 2 are connected to each other by axially tensionable connecting element such as bolt 5 and nut 9. Preferably, at least two, uniformly spaced axially tensionable connecting elements are provided. The bolt 5 extends coaxially through a bore 6 having an enlarged counter-sunk recess 6a in the frontal face of the flange 4 of the coupling section 2. An annular disk 7, provided with a coating of granular material 8, at least on its front surface 11, is functionally held in the recess 6a. The annular disk 7 faces the opposite section of the coupling and the front surface 11 juts out slightly from the front face of the flange 4 across the gap 12 normally provided between the flanges 3 and 4. The two coupling sections thereby come into contact exclusively by way of the coated annular surface of the disks 7, and are secured by tightening the connecting elements.

The layer of coating of the granulate material may also be made on the peripheral surfaces of the disk 7. The disk 7 is made of elastomeric material so that it may be easily compressed as the bolt 5 is tightened. The gap 12 is likewise closed by the tightening of the bolt 5. The disk 7 may be flat and washer-like, although it is preferred to have some axial length thereby having the shape of a plug, so that on compression it will functionally lock within the recess 6a and any distortion created by compressing the disk will not result in voids or openings on the front faces. If desired, the layer of granulate material may be partially embedded or molded in the disk 7.

Under the effect of the subsequent tensile force created by tightening the nuts 9 on the screws 5, the granular material 8 is pressed against the surface of the opposing flange 3 in the embodiment shown in the Figure. This results not only in a friction-tight connection between the coupling sections 1 and 2, but also in a form-fit-like state between the connecting bolt and the recess which contributes to the transfer of the circumferential force or torque between the coupling sections. It is thus possible to use connecting means, such as bolts or other screw means, which are dimensionally smaller than those normally used, and similarly to provide flanges having the outside diameter of the coupling sections 1 and 2 which are also smaller than those normally used.

The two flanges 3 and 4 of the respective coupling sections 1 and 2 are preferably of different dimensions, as for example in the axial direction, so that at least one of the flanges can deform elastically under the tension force of the connecting elements in order to attain an even distribution of force over the annular surfaces of the disks 7. In this form of construction, the coating of granular material 8, which is directly applied to the flange surface, is also provided between the head of the bolt 5 and the rear or axially outer surface 3b of the flange 3 of the coupling section or half 1. An optimal effect is attained if the bolt 5 is pretensioned and extended prior to the tightening of the holding nut 9 so that the granular material 8 of the coating is not removed when the nut 9 is turned.

The granular material for coating of the contact surfaces or faces can be applied as a very thin and even layer by the application of suitable processes, for instance, painting or by pressure spraying or detonation processes, so that in contrast to the use of abrasive materials of a known type, no settlement of the coating occurs and there is no loss of pretension of the connecting elements, produced between the contacting surfaces.

The coupling sections can be held to the rotary machine part, such as a shaft or the like, by any means such as a universal joint, a transverse through bolt or the like. Such elements are not shown here because they are conventional and well known.

Various modifications, changes and embodiments have been shown and described herein and others will be obvious to those skilled in this art. Accordingly, it is intended that the present disclosure be taken only as illustrative and not as limiting the scope of the invention.

I claim:

1. A coupling for rigidly connecting a pair of coaxial machine parts, comprising:
   a pair of tubular coupling sections each having radially extending flanges with each flange provided with a front face adapted to about said front face of said other flange;
   an axially tensioned connecting element extending through said front faces to connect said front faces and thus said pair of coupling sections; and
   a layer of granular material is positioned between said contacting front faces in the area of said axially tensioned connecting element, wherein one of said front faces has a recess for receiving said layer of granular material, and wherein said layer of granular material increases the friction force between said front faces.

2. The coupling according to claim 1, wherein said connecting element includes a screw and wherein said layer of granular material is provided on the opposing front faces of said coupling sections about the annular area around the screw.

3. The coupling according to claim 1, wherein said layer of granular material is provided on only one of the front faces of said pair of coupling sections.

4. The coupling according to claim 1, wherein said layer of granular material consists of tungsten carbide.

5. A coupling for rigidly connecting a pair of coaxial machine parts, comprising:
   a pair of tubular coupling sections each having radially extending flanges with each flange provided with a front face adapted to abut the front face of the other flange;
   an axially tensioned connecting element extending through said front faces to connect said pair of coupling sections, wherein said connecting element includes a screw; and
   a layer of granular material positioned between the contacting front faces at least in the area of said axially tensioned connecting element, wherein said layer of granular material is provided on an annular disk located about the screw, and wherein one of said front faces is countersunk to form a recess for receiving said annular disk.

6. The coupling according to claim 5, wherein said disk is in the shape of an annular washer.

7. The coupling according to claim 5, wherein said disk comprises an elongated plug functionally held in the recess countersunk in the one of the front faces, said plug protruding axially from the one of the front faces toward the other of the front faces.

* * * * *